H. W. ROGERS.
FILM CONTROL MECHANISM FOR MOTION PICTURE AND SOUND REPRODUCING MEANS.
APPLICATION FILED SEPT. 25, 1916.
1,254,436.
Patented Jan. 22, 1918.
3 SHEETS—SHEET 1.
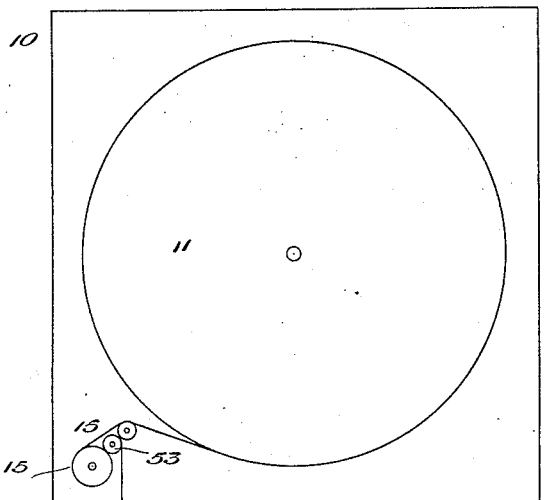
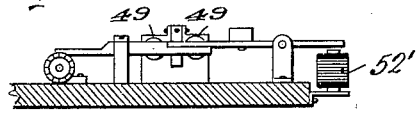
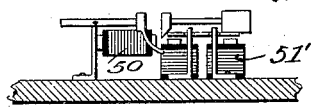
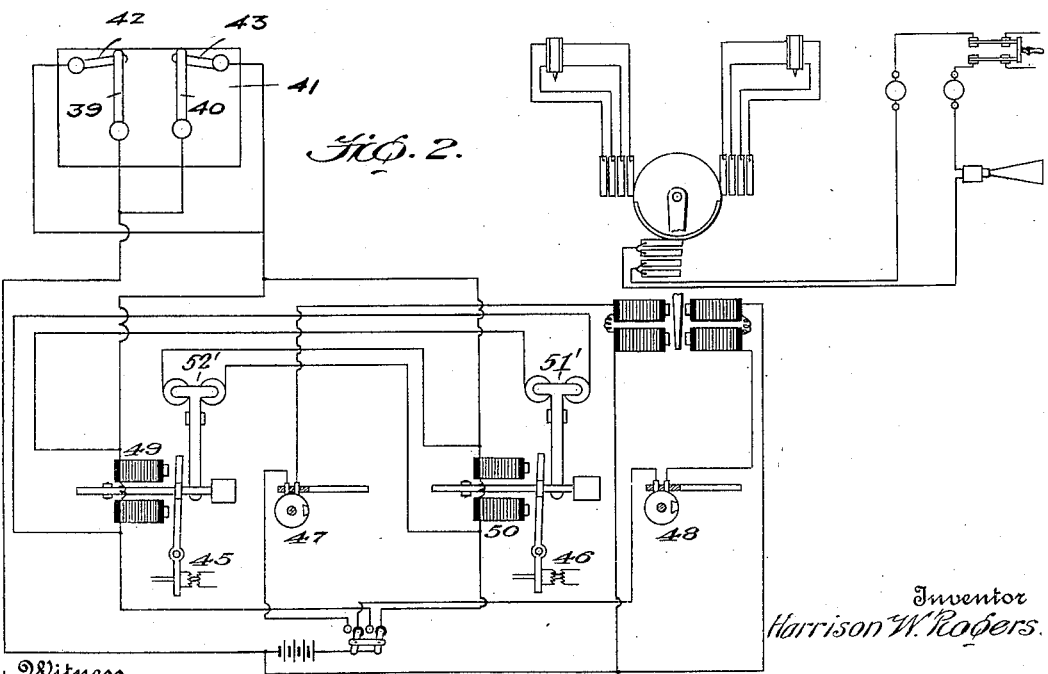
Inventor
Harrison W. Rogers.

H. W. ROGERS.
FILM CONTROL MECHANISM FOR MOTION PICTURE AND SOUND REPRODUCING MEANS.
APPLICATION FILED SEPT. 25, 1916.
1,254,436.
Patented Jan. 22, 1918.
3 SHEETS—SHEET 2.
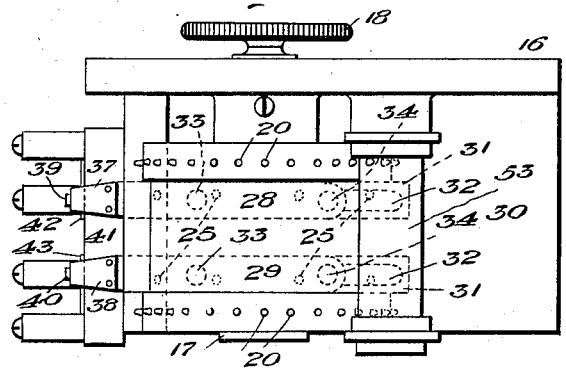
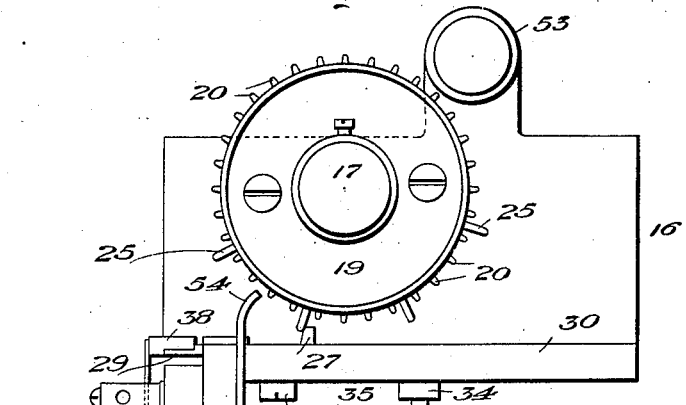
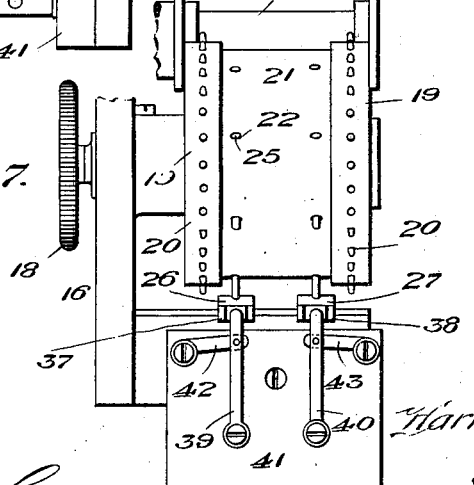
Inventor
Harrison G. Rogers
Witness
By
Attorney H. W. ROGERS.
FILM CONTROL MECHANISM FOR MOTION PICTURE AND SOUND REPRODUCING MEANS.
APPLICATION FILED SEPT. 25, 1916.
1,254,436.
Patented Jan. 22, 1918.
3 SHEETS—SHEET 3.
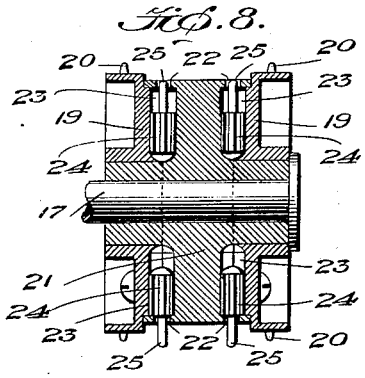
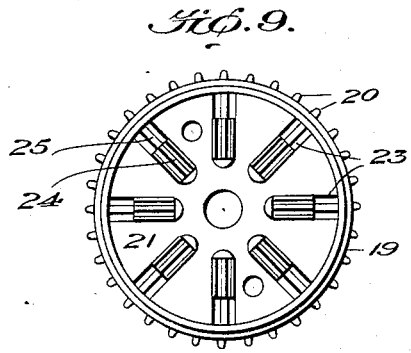
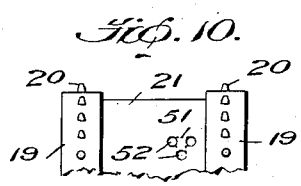
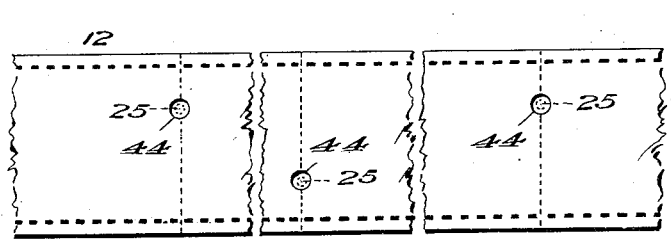
Inventor
Harrison W. Rogers
By David P. Moore
Attorney
Witness

UNITED STATES PATENT OFFICE.

HARRISON W. ROGERS, OF NEW YORK, N. Y.

FILM-CONTROL MECHANISM FOR MOTION-PICTURE AND SOUND-REPRODUCING MEANS.

1,254,436.  Specification of Letters Patent.  Patented Jan. 22, 1918.

Application filed September 25, 1916. Serial No. 122,028.

*To all whom it may concern:*

Be it known that I, HARRISON W. ROGERS, a citizen of the United States, residing at New York, in the county of New York and State of New York, have invented certain new and useful Improvements in Film-Control Mechanism for Motion-Picture and Sound-Reproducing Means, of which the following is a specification, reference being had therein to the accompanying drawing.

This invention relates to a means whereby the film or motion picture projection machine automatically controls the connection and disconnection of a sound reproducing mechanism, so that the operation of the two will be in synchronism as set forth in my co-pending application, filed February 7, 1913, Serial No. 746,890, one object of the present invention being the provision of a means whereby the film is not subjected to any undue strains that will tend to break the same, but by means of which the operation of the connecting and disconnecting of the mechanisms is made positive.

A further object of this invention is the provision of a device of this type which is readily connected to the film magazines of the various motion picture projectors now in use without interfering with the use of the machines for the projection of silent pictures, but which can be readily converted by the passage of the film through the present device for producing synchronously with the pictures, sound, such as talking, singing, and music, or other noises.

Up to the present time there have been devised many ways of operating varying film clutch mechanisms or electrical devices that insure the setting in motion at the proper instant of sound reproducing mechanism, some of them embodying operators in the films through which electrical contact is made, the film acting as an insulator, projections or buttons carried by the film that must pass between tensioned rollers that control switches which also has a tendency to tear the film after continued usage and also the carrying by the body of the film of magnetic metal to attract the magnetic device upon the switch to close the clutch operating circuit.

These devices all have faults in that in some cases the contact is not maintained sufficiently long to insure of the operation of the clutch, while in other cases the life of the film is impaired.

In the present instance, the film is passed around a rotating drum which is provided with a plurality of radially slidable pins, the film being provided at the proper intervals with openings of larger area than the pin or pins, so that by gravity or in some instances, assisted by magnetism, the pins are projected through the opening in the film, and by the movement of the film, such pin is brought into contact with a switch closing device, so that a positive actuation of the switch without strain upon the film is produced.

With the foregoing and other objects in view and which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:—

Figure 1 is a diagrammatic view of one type of film mechanism showing the present switch controlling device mounted therein.

Fig. 2 is a diagrammatic view showing the clutch throwing mechanism, the present switch controlling device, and the electrical connections thereof.

Figs. 3 and 4 are detail views of one method of operating the clutch for connecting and disconnecting the sound reproducing means.

Fig. 5 is a top plan view of the switch controlling device *per se.*

Fig. 6 is a side elevation thereof.

Fig. 7 is an end view taken from the left as seen in Fig. 6.

Fig. 8 is a cross sectional view through the pin carrying member.

Fig. 9 is a detailed end elevation of said member with one of the disks removed.

Fig. 10 is a detailed fragmentary view of a modified form of pin carrying member.

Fig. 11 is a plan view of portions of a film showing the location of the openings therein, dotted lines illustrating the position of the pins when seated in such openings.

Referring to the drawings, the numeral 10 designates the magazine for the projector mechanism which may be taken as indicative of any magazine now in use, there being mounted therein as usual the film reel, 11, so that the film 12 under ordinary conditions will pass through the guide opening 13 to the projector mechanism 14.

In this instance, mounted in one corner of the magazine is the switch controller 15, the detailed construction of which will now be set forth. This switch control mechanism includes the supporting structure 16 having rotatably mounted therein the shaft 17 provided with the operating or milled wheel 18, by means of which the shaft may be rotated manually to insure the proper starting position of the parts relatively to the film.

Connected to the shaft are the two end disks 19, each one of which is provided with teeth 20 for receiving the sprocket openings of the film 12. Detachably connected to and between the disks 19 is a cylinder 21 which is provided with a plurality of pairs of openings 22, while formed within the cylinder or drum are the radial grooves 23 which coöperate with the radial grooves 23' of the disks 19 to form radial pockets.

Mounted in each of these pockets for radial sliding movement is a fluted guide stem 24 for the pin 25, the same being of such a combined length as to normally be within the peripheral way of the cylinder or drum when retracted, but to be projected by gravity so as to be placed in the path of the respective lugs 26 and 27 carried by the respective slidable plates 28 and 29, which are mounted upon the horizontal shelf 30 of the support 16 in grooves 31.

Two parallel slots 32 are also provided in the shelf 30 below the grooves 31 and projected therethrough are the holding pins 33 and 34 for the members 28 and 29, the respective springs 35 being connected as illustrated to normally hold the members 28 and 29 so that the blocks 37 and 38 will engage the resilient switch members 39 and 40 mounted upon the block 41 of insulation so as to hold them out of contact with the fixed contacts 42 and 43.

The film 12, as clearly illustrated, is provided with a plurality of openings 44 which, as the same comes in line with any of the respective pins of the drum, will permit such pin to fall by gravity as such pin bridges the shelf 30 and into the path of either one of the lugs 26 or 27, according to which switch controlling plate 28 or 29 is to be operated, said switches being adapted to control each clutch mechanism 45 or 46, whereby either one of the sound reproducing means 47 or 48 is connected for synchronous operation with the motion picture projector. These openings in the film are of such a diameter that the pin never engages the edge thereof, so that there is no wear or tear placed upon the body of the film, and a positive actuation of either one of the members 28 or 29 is assured so that the respective switches are positively controlled and of a sufficient length of time to insure the actuation of the respective clutch throwing solenoids or electro-magnets 49 and 50. Connected in circuit with the electro-magnet 49 is the clutch releasing magnet 51', while connected in circuit with the clutch throwing eletro-magnet 50 is the clutch releasing electro-magnet 52', this construction being especially desirable when two sound reproducing machines, as illustrated in Fig. 2, are to be operated one at a time. Thus the switch 37—42 controls the energization of the electro-magnets 49—51', while the switch 40—43 controls the energization of the electro-magnets 50—52'.

As shown in Fig. 10, instead of circular openings in the drum, the T-shaped openings 51 are provided, each radially slidable member in this instance being provided with a plurality of pins 52 for projection through said openings and for actuating the switch controlling members 28 and 29.

Carried by the support 16 at such a point as to properly guide the film away from the drum and particularly after the resistance pins have been withdrawn within the drum so no tearing action or pull would be given to the film, is the guide pulley 53.

Should auxiliary means for assisting in the projection of the pins be necessary, the members 16 and the parts carried thereby will be made of non-magnetic metal, so that the horse shoe magnet 54 may be so disposed as to attract the respective pins through the alined opening of the film so that the pin will be projected into the path of to engage its respective lug.

With the circuit arrangements, as shown in Fig. 2 and it being assumed that the apparatus is being operated so that one of the sound reproducing machines is being driven, the electro-magnet 49 having been energized to operate its clutch 45 while the electro-magnet 51' had been energized to assist in releasing the clutch 46, should the film break the passage of the broken portion of the film below the drum will permit the projection of two of the pins 25 so that both of the lugs 26 and 27 will be engaged and moved to in turn permit the simultaneous closing of the switches 39—42 and 40—43. This action will cause the simultaneous energization of all of the electro-magnets 49, 51', 50 and 52' and consequently the effect upon the two clutches 45 and 46 will be such as to permit the opening thereof and thus the disconnection of both of the sound reproducing machines from the driving mechanism. In other words, instead of both machines being connected for operation at the same time, both clutches would be permitted to open if all four of the electro-magnets were energized simultaneously, which would be the case due to the breakage of the film.

It is also apparent that when the body of the film is passing around the drum, the pins will be held from projection, and that it will be absolutely necessary for one of the openings to be in alinement with the film to permit such projection.

It will be noted that the openings in the film are placed near the center and on the marginal lines between the pictures, those upon the left of the center being provided to control the operation, as for instance, of the member 28, while those upon the right will control the operation of the member 29 of the switch controller.

It is also apparent that where desired and found necessary, a successive number of these openings may be provided to insure the closure of the respective switches a sufficient interval of time and the consequent positive action of the clutch.

By fluting or corrugating the stems 24, a free sliding movement within the pockets of the pin carrying member without creating a vacuum is permitted.

What I claim as new is:—

1. The combination with a motion picture projector machine and a sound reproducing machine, of mechanism for connecting the two for synchronous operation including a film, provided with an opening therein, a rotatable drum about which the film passes and through the medium of the film is operated, a plurality of radially slidable pins carried by the drum for projection through the respective opening of the film, and a switch operating member disposed in the path of the pins and adapted to be operated by a projected pin.

2. The combination with a motion picture projector machine, a sound reproducing machine, and a transmission mechanism between the two, of means for controlling the transmission mechanism for connecting the two for synchronous operation, including a film, provided with an opening therein, a rotatable drum about which the film passes and through the medium of the film is operated, a plurality of radially slidable pins carried by the drum for projection through the respective opening of the film, and a switch operating member disposed in the path of the pins and adapted to be operated by a projected pin.

3. The combination with a motion picture projector machine, a sound reproducing machine, and a transmission mechanism between the two, of means for controlling the transmission mechanism for connecting the two for synchronous operation, including a film provided with an opening therethrough, a rotatable drum, a plurality of radially slidable pins for projection within and beyond the periphery of the drum, an electrical circuit having a source of electrical energy, a clutch throwing electrical device, a switch, and means operably connected to the switch and disposed in the path of a projected pin for actuating the switch to energize the clutch throwing electrical device.

4. The combination with a motion picture projecting machine, a sound reproducing machine, and transmission mechanism between the two and having a clutch, of electro-magnetical means for actuating the clutch and including a film provided with an opening, a rotary drum about which the film passes, a plurality of radially slidable pins carried by the drum and adapted to be retracted within and projected beyond the periphery of the drum, said pins being adapted when in alinement with the opening of the film to be projected, an electrical device for controlling the clutch, a source of electrical energy, a switch, a circuit including said switch, a source of electrical energy and said clutch operating device, and means disposed in the path of the pin when projected for actuating the switch to energize the clutch throwing device.

5. The combination with a motion picture projecting machine, a sound reproducing machine, and transmission mechanism between the two and having a clutch, of electro-magnetical means for actuating the clutch and including a film provided with an opening, a rotary drum about which the film passes, a plurality of radially slidable pins carried by the drum and adapted to be retracted within and projected beyond the periphery of the drum, said pins being adapted when in alinement with the opening of the film to be projected, an electrical device for controlling the clutch, a source of electrical energy, a switch, a circuit including said switch, a source of electrical energy, and said clutch operating device, a slidable member having a projection disposed in the path to be engaged by a projected pin, and means carried thereby for controlling the switch.

6. A film controlled switch actuated device including a support, a film rotated drum carried thereby, a plurality of radially slidable pins carried by the drum for retraction therewithin and projection beyond the periphery thereof, a normally open switch, a slidable member mounted in the support, a spring for engaging the same to normally hold the switch open, and a projection carried by the slidable member and disposed in the path to be engaged by a projected pin for operating the slidable member in opposition to the spring to permit the closure of the switch.

7. A film controlled switch actuated device including a support, a rotatable drum carried thereby and adapted to be rotated by the film, a plurality of radial sleeves mounted within the drum, a plurality of radially slidable pins mounted in the sleeves for retraction within and projection beyond the periphery of the drum, and a switch controller disposed in the path to be engaged by a projected pin.

8. A film controlled switch actuated device including a support, a rotatable drum carried thereby and adapted to be rotated by the film, a plurality of radial sleeves mounted within the drum, a plurality of radially slidable pins mounted in the sleeves for retraction within and projection beyond the periphery of the drum, and a switch controller disposed in the path to be engaged by a projected pin, said controller including a slidable plate mounted in the support, a spring for normally holding the plate in one direction, and a lug carried by the plate to be engaged by the pin, whereby the plate is moved in opposition to the spring.

9. The combination with a motion picture projector machine and a sound reproducing machine, a mechanism for connecting the two for synchronous operation, including a film, a rotatable member about which the film passes and which through the medium of the film, is operated, and coöperable switch operating means carried by the rotatable member and in the path thereof, said members being held out of operation by the film when the film is interposed therebetween and adapted to coöperate when released by the film.

In testimony whereof I affix my signature.

HARRISON W. ROGERS.